United States Patent
Song et al.

(10) Patent No.: US 10,404,676 B2
(45) Date of Patent: Sep. 3, 2019

(54) METHOD AND APPARATUS TO COORDINATE AND AUTHENTICATE REQUESTS FOR DATA

(71) Applicant: Intel Corporation, Santa Clara, CA (US)

(72) Inventors: Justin J. Song, Olympia, WA (US); Devadatta V. Bodas, Federal Way, WA (US); Muralidhar Rajappa, Chandler, AZ (US); Andy Hoffman, Olympia, WA (US); Mariusz Oriol, Gdynia (PL); Gopal R. Mundada, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 356 days.

(21) Appl. No.: 15/084,377

(22) Filed: Mar. 29, 2016

(65) Prior Publication Data
US 2017/0289300 A1 Oct. 5, 2017

(51) Int. Cl.
*H04L 29/06* (2006.01)
*G06F 1/3203* (2019.01)
*G06F 21/55* (2013.01)
*H04L 12/24* (2006.01)

(52) U.S. Cl.
CPC .......... *H04L 63/08* (2013.01); *G06F 1/3203* (2013.01); *G06F 21/554* (2013.01); *H04L 41/04* (2013.01); *H04L 41/24* (2013.01)

(58) Field of Classification Search
CPC .............. G06F 21/30; H04L 9/00; H04L 9/32
USPC .............. 713/185–189; 714/47.2; 726/5–8; 370/235–237
See application file for complete search history.

(56) References Cited

U.S. PATENT DOCUMENTS

| | | | |
|---|---|---|---|
| 7,664,867 B2 * | 2/2010 | Lockhart, Jr. | H04L 67/02 370/229 |
| 8,417,774 B2 * | 4/2013 | Flynn | G06F 3/0613 709/204 |
| 8,694,698 B2 * | 4/2014 | Mizuno | G06F 3/0611 710/33 |

(Continued)

OTHER PUBLICATIONS

PCT Application No. PCT/US2017/017024, International Search Report and the Written Opinion, dated May 26, 2017, 14 pgs.

(Continued)

*Primary Examiner* — Lynn D Feild
*Assistant Examiner* — Viral S Lakhia
(74) *Attorney, Agent, or Firm* — Womble Bond Dickinson (US) LLP (57) ABSTRACT

A method and apparatus for coordinating and authenticating requests for data. In one embodiment, the apparatus comprises: a baseboard management controller (BMC); and a request coordinator coupled to the BMC to intercept BMC requests and to provide intercepted requests to the BMC, where the coordination interface comprises a request parser to parse parameters for each of the BMC requests, one or more queues to store the requests while the BMC is servicing another BMC request, and a command submitter to send individual BMC requests to the BMC, wherein the BMC is operable to generate the responses to the BMC requests received from the coordination interface and to send the responses to the coordination interface.

20 Claims, 8 Drawing Sheets

(56) References Cited

U.S. PATENT DOCUMENTS

| | | | |
|---|---|---|---|
| 8,819,202 B1* | 8/2014 | Carolan | H04L 41/5054 709/223 |
| 8,886,703 B2* | 11/2014 | Kozlowski | G06F 9/5044 709/201 |
| 8,930,725 B2* | 1/2015 | Wang | H04L 12/6418 713/300 |
| 2002/0019886 A1* | 2/2002 | Sanghvi | G06F 9/542 719/318 |
| 2005/0267956 A1 | 12/2005 | Huang | |
| 2008/0086580 A1 | 4/2008 | Zhang et al. | |
| 2010/0036982 A1 | 2/2010 | Hardy et al. | |
| 2010/0180161 A1* | 7/2010 | Kern | G06F 11/2028 714/47.2 |
| 2010/0281246 A1* | 11/2010 | Bristow | G06F 11/1425 713/100 |
| 2013/0128896 A1* | 5/2013 | Munoz | H04L 49/9078 370/412 |
| 2014/0047243 A1* | 2/2014 | Lo | G06F 8/71 713/189 |
| 2014/0122910 A1 | 5/2014 | Chiu et al. | |
| 2014/0195657 A1 | 7/2014 | Bhatia et al. | |
| 2014/0201301 A1 | 7/2014 | Bradley et al. | |
| 2014/0215489 A1* | 7/2014 | Bhatia | G06F 9/546 719/313 |
| 2014/0280837 A1 | 9/2014 | Ayaman et al. | |
| 2014/0344431 A1 | 11/2014 | Hsu et al. | |
| 2015/0052596 A1* | 2/2015 | Ayanam | G06F 21/572 726/8 |
| 2015/0207731 A1* | 7/2015 | Swaminathan | H04L 45/74 370/392 |
| 2015/0282003 A1* | 10/2015 | Noerpel | H04B 7/18584 370/236 |
| 2015/0338896 A1 | 11/2015 | Khatri et al. | |
| 2015/0373017 A1* | 12/2015 | Oelke | G06F 11/3048 726/9 |
| 2015/0381598 A1* | 12/2015 | Koved | H04L 63/08 726/3 |
| 2015/0381709 A1* | 12/2015 | Word | H04L 49/90 709/203 |
| 2016/0018883 A1 | 1/2016 | Varma et al. | |
| 2017/0024263 A1* | 1/2017 | Verplanken | G06F 9/546 |
| 2017/0104770 A1* | 4/2017 | Jreij | H04L 63/1416 |

OTHER PUBLICATIONS

Libby, Richard., "Effective HPC hardware management and Failure prediction strategy using IPMI," Linux Symposium, pp. 275-284, Jul. 2003.

* cited by examiner

METHOD AND APPARATUS TO COORDINATE AND AUTHENTICATE REQUESTS FOR DATA

FIELD OF THE INVENTION

Embodiments of the present invention relate to the field of request handling in node-based computing systems such as, for example, High Performance Computing (HPC); more particularly, embodiments of the present invention relate to queuing and processing sensor-related requests to avoid having to decline responding to such requests.

BACKGROUND OF THE INVENTION

Systems providing services such as, for example cloud services, often employ hundreds of thousands of servers to provide those services. Many servers are used for specific types of workloads or tasks. Depending on the tasks, power performance tradeoffs may exist. These systems include High Performance Computing (HPC).

Server node density is increasing dramatically now and in the foreseeable future. In many designs, multiple nodes share common power supplies and are placed on one blade. Managing power for such nodes and blade servers is a key factor that affects nodes density and cost.

Since power management becomes essential for server systems, it is necessary to get the power of every node in the system for the system and job power monitoring purpose. On most server nodes, there is a master controller or co-processor which is responsible for servicing power queries. For example, a BMC (Board Management Controller) is widely used by many Original Equipment Manufacturer (OEMs). Due to the nature of slow power sampling and averaging, power query via a BMC is slow, with the latency ranging from several milliseconds to hundreds of milliseconds. Before the BMC finishes its current transaction, it cannot service a new requester. Because the latency is long, on today's HPC systems, a BMC is often flooded. Requests that arrive when the BMC is busy are returned with an error "BMC being busy". This type of problem is referred to herein as a "denial of service".

Obviously, too many such errors result in a node power samples loss. For server systems running applications whose power varies over time, it may result in inaccuracy of power monitoring. Power control actions (e.g., setting new power caps per node, per rack or per job) usually depend on current and historical power consumption, so this inaccuracy could lead to a wrong power control action.

Some management software such as Data Center Manager (DCM) uses the BMC's return messages not only for getting power readings, but also for detection of whether the node is online and in a responsive state. If it often receives denial of service, this software will think the node cannot be monitored and/or power controlled and will wait for fairly long time to retry. This results in performance loss.

Denial-of-service can also cause performance throttling. For example, if power management software wants to set high frequency (e.g., P-state P0 or P1) on a particular node, but that node's BMC declined to service that request because it was busy servicing other requests, then the node might be forced to run at a lower p-state (e.g., P8/P9) and suffer performance loss.

Reliability, Availability, and Serviceability (RAS) is also a popular capability on a large group of servers. A denial of service could result in incomplete data in a RAS database. During Open Resilient Cluster Manager (ORCM) RAS validation, co-existence of two software instances that both need access Intelligent Platform Management Interface (IPMI) sensors via a BMC were found to experience this problem.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
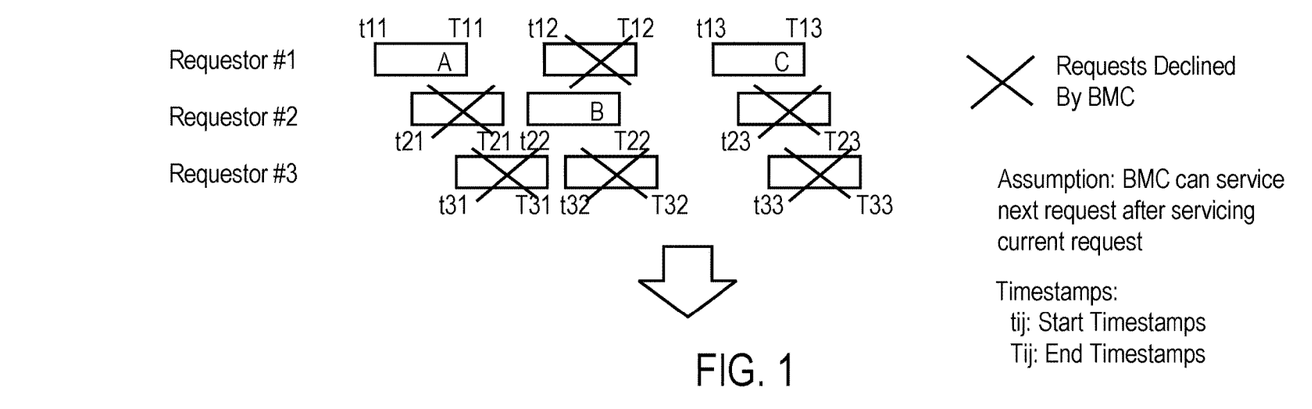
FIG. 1 illustrates a group of bursty BMC requests for a sensor.

FIG. 1 illustrates a group of bursty BMC requests for a sensor. Such as sensor could be, for example, a power supply unit (PSU) input power sensor. Referring to FIG. 1, each of the requesters #1-#3 provides three separate requests. In one embodiment, the requesters can be any software entity that uses IPMI access libraries, an IPMI plug-in, a $3^{rd}$ party IPMI application or tool. If a BMC is servicing a request, the BMC can only service the next request after it has completed servicing the current request. Therefore, any requests that occur while the BMC is already servicing a request, the BMC declines the requests, as it cannot service those requesters. In such a case, the BMC returns the with an error "BMC being busy". This is referred to as the "denial of service".

In order to solve the denial of service problem, in one embodiment, a coordination entity is used to handle the requests that are sent to a management entity such as the BMC. In one embodiment, the entity is aggregation point of all (or some large portion) management (e.g., BMC) requests and buffers requests on behalf of the management entity.

Figure 2:
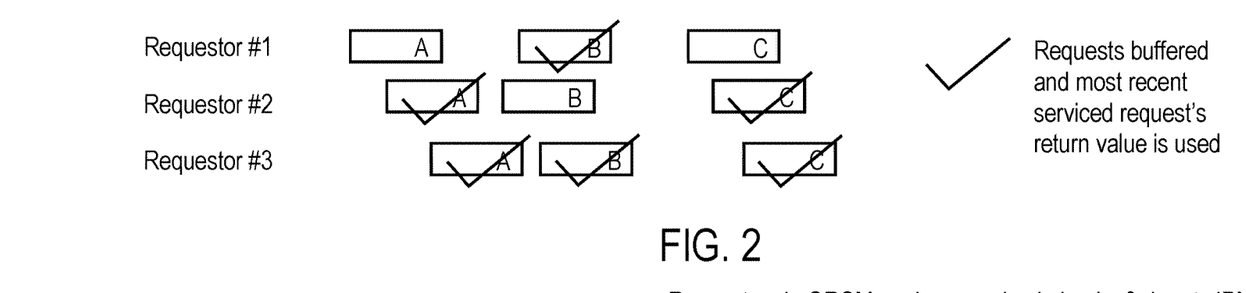
FIG. 2 illustrates results of using the queue and query processing techniques described herein.

FIG. 2 illustrates results of using the queue and query processing techniques described herein. Referring to FIG. 2, using the techniques described herein, the same set of requests from FIG. 1 are shown, with the ones that were declined previously being buffered. In one embodiment, the request's return value is used to satisfy the request.

In one embodiment, in a local node where users have freedom to independently submit BMC requests (especially super user like root complex), the entity reside in the operating system (OS) kernel or an IPMI driver running in kernel mode, from which the entity intercept BMC requests. In another embodiment, to handled out-of-band BMC requests, the coordination entity reside in BMC firmware. In this case, software based aggregation may not be necessary. It may be necessary to cache both in-band and out-of-band requests.

In one embodiment, the coordination entity queues BMC requests with same input parameters in the same queue. These may be queued in proximity (e.g., next to) each other. In the same queue, a request received while serving another request is not actually submitted to the BMC. Instead, such a request is returned with the most recent service's return value.

In one embodiment, if an authentication results indicates that another BMC request's return value should not be used, then the request will be rescheduled and actually delivered to BMC.

In one embodiment, if an actual BMC service time is very long, then the returned value might be stale, and data from the cache cannot be used. In such a case, the request is rescheduled and actually delivered to BMC.

The techniques described herein avoid the BMC's denial of service problem for the same IPMI information query (e.g., different requesters ask for the same node power). Therefore, the denial-of-service incurred back-off problem is avoided. For example, a large portion of performance throttling can be eliminated.

Note that the reduction of the BMC denial-of-service also increases fidelity of server power monitoring.

Thus, using the techniques described herein, the coordination entity can protect servers from a rogue software that can flood the BMC with service requests that can result in denial of service and system problems described above.

Figure 3:
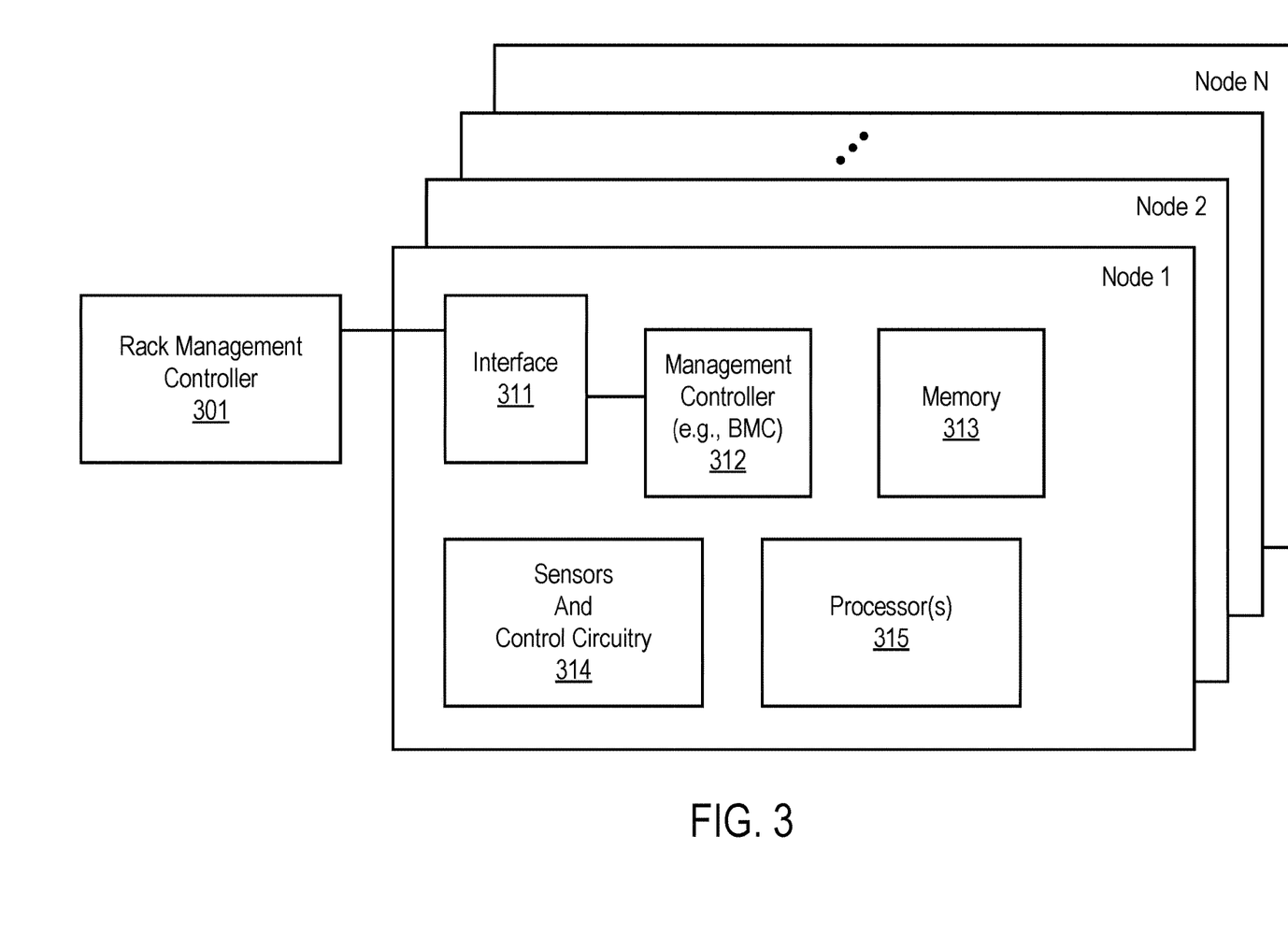
FIG. 3 is a block diagram of one embodiment of a rack server system

FIG. 3 is a block diagram of one embodiment of a rack server system. Referring to FIG. 3, the rack server system includes several nodes 1 to N communicably coupled to a rack management controller (RMC) 301. These may be compute or computer nodes. In one embodiment, a node is a logically independent computer system that is equipped with at least one central processing unit (CPU), memory and input/output (I/O). In one embodiment, nodes 1 to N are coupled to RMC 301 through a switch unit, for executing corresponding data transmission operations. In addition, the rack server system may be a rack data center providing basic equipment and services IaaS (infrastructure as a service, IaaS), and the switch unit may be a switch hub.

Each of the nodes 1 to N comprises a connection interface 311, a management controller 312, memory 313, sensors and control circuitry 314, and one or more processors (or CPUs) 315. In one embodiment, management controller 312 comprises a baseboard management controller (BMC). Management controller 312 is used to manage each node, and may include management hardware and software for each node. System management information, such as power, temperature, operating system status, and the like may be collected by the management controller 312.

Processors 315 may have one or more CPUs having one or more execution cores for executing instructions, which are stored in memory 315. In one embodiment, sensors and control circuitry 314 includes sensor devices for measuring various operating and performance-related parameters within the node. The sensor devices may be either hardware or software based components configured or programmed to measure or detect one or more of the various operating and performance-related parameters. Sensors may include, without limitation, tachometers, thermal sensors, voltage meters, amp meters, energy meters and fan speed sensors. Management controller 312 may receive this information sensed by the sensors via a communication bus for analysis, and more particularly, for determination as to whether an "event" is occurring within node.

Although not shown, each of nodes 1 to N includes a power supply. The power supply may be controlled to delivery power to the nodes and its components to enable performance of operations.

In one embodiment, management controller 312 is coupled to the power supply for detecting the operation statuses of the nodes 1 to N, so as to provide power information corresponding to nodes 1 to N. The power information includes the voltages, currents, and power consumptions of the nodes 1 to N, etc.

In one embodiment, management controller 312 is a general purpose computer system. In another embodiment, management controller 312 is a "special purpose" computer system or a system that incorporates more than one interconnected system, such as a client-server network. Indeed, management controller 312 only represents an exemplary embodiment of the present disclosure, and therefore, should not be considered to limit the disclosure in any manner. As discussed above, in one embodiment, management controller 312 comprises a BMC. One skilled in the art would appreciate that other similar devices can be used in place of management controller 312. In one embodiment, the BMC includes one or more processor and/or co-processors, memory, firmware stored in memory, and network interface controller.

Management controller 312 is communicatively connected to components in nodes 1 to N. In one embodiment, management controller 312 is connected to node components via an interconnect or other interface. In one embodiment, management controller 312 is connected to node components via the Intelligent Platform Management Interface (IPMI), which is well-known in the art for system monitoring and event recovery, and includes a set of predefined commands for reading temperature, voltage, fan speed, chassis intrusion, and other parameters.

In one embodiment, management controller 312 receives external requests such as an IPMI messages through a network or other external interface, from rack management controller 301. These may include commands such as, for example, Get Sensor Reading, and include information identifying the specific sensor for which data is sought. Such communication may be over a network, such as, for example, the Internet, a local area network (LAN), or a wide area network (WAN).

Figure 4:
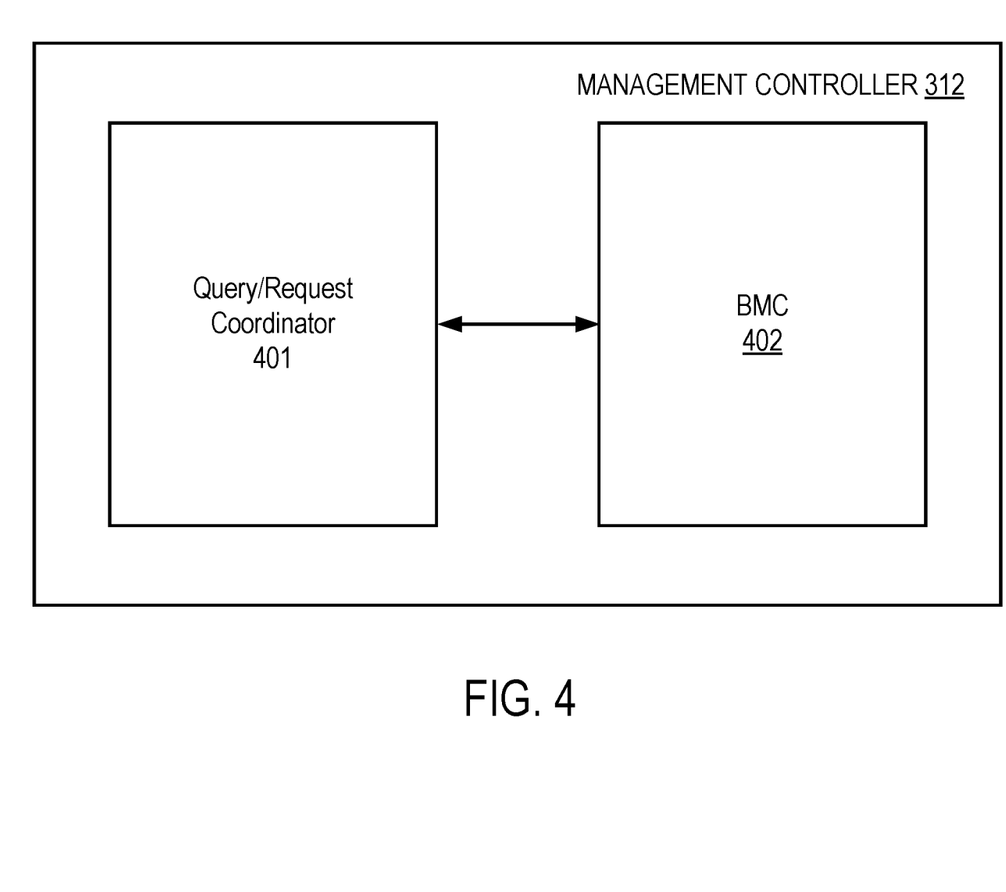
FIG. 4 illustrates a management controller comprising query/request coordinator and BMC.

In one embodiment, the management controller comprises a BMC and the rack server system includes a coordination entity to act as an interface for requests to the BMC. FIG. 4 illustrates a management controller comprising query/request coordinator 401 and BMC 402. More specifically, in one embodiment, the query/request coordinator intercepts all BMC requests and parses their parameters. The query/request coordinator queues the BMC requests. In one embodiment, the query/request coordinator uses multiple queues (or its functional equivalent of a memory and the use of pointers) and places requests for the same information into the same queue.

Instead of flooding the BMC with requests, the query/request coordinator only allows one request to go to the BMC at a time. When the BMC returns values in response to the requests, the queued requests of the same type are checked to determine if there are other queued requests for the same value(s). If so, the return values are forwarded to the pending requests.

Figure 5:
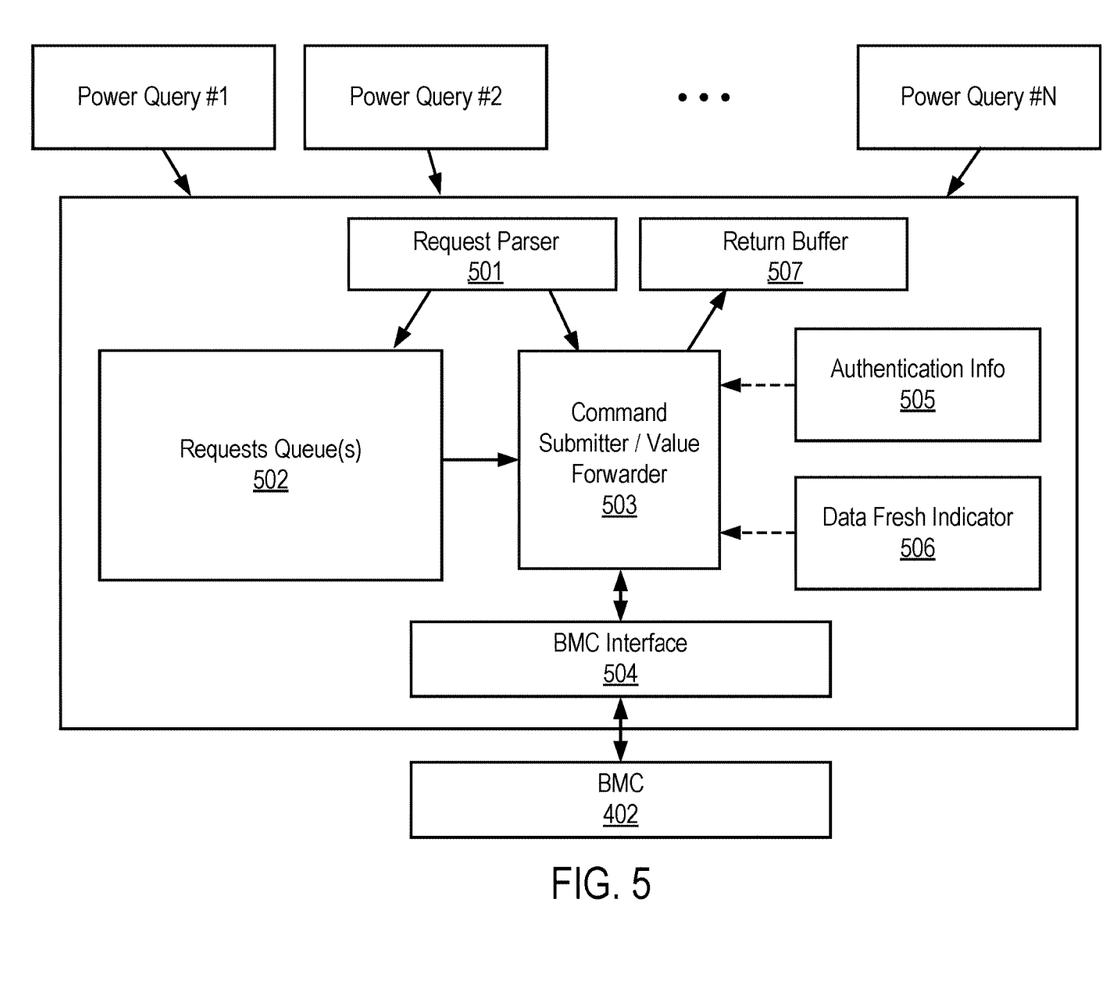
FIG. 5 is a block diagram of one embodiment of a request coordinator.

FIG. 5 is a block diagram of one embodiment of a request coordinator. Note that the coordination entity may be part of a BMC, or other management controller, or may be separate from the BMC. In one embodiment, each of the units or modules may comprises may comprise hardware (circuitry, dedicated logic, etc.), software (such as is run on a general purpose computer system or a dedicated machine), firmware, or a combination of the three.

Referring to FIG. 5, power queries 1-N are sent to the BMC. Request coordinator 500 intercepts the power queries. In one embodiment, request parser 501 parses the parameters of the BMC requests to create one or more atomic operations for the BMC to service. For example, one power query may be "ipmiutil get raw sensor READEIN for PSU#1 at address 0x3f8". In one embodiment, each query could include one or more parameters and these are all separate into separate requests for BMC 402. In one embodiment, these parameters related to sensor requests to provide data related to sensors and their readings or measurements. In one embodiment, a parameter is a pre-defined telemetry name or a raw sensor's address. In either ease, they are handled one by one; if a tool submits 1+ parameters, then inside the tool or in a lower library, the command will be split into multiple ones.

Request parser 501 can send the parsed request parameters to command submitter/value forwarder 503, which sends a BMC request one at a time to the BMC via BMC interface 504 if BMC 402 is not busy or to request queue(s) 502 if BMC 402 is busy.

In one embodiment, request queue(s) 502 comprises one request queue. In another embodiment, request queue(s) 502 comprises multiple queues, with each queue designated to store the same input parameter. In such as case, all BMC requests in the same queue request the same information. Thus, in one embodiment, before retirement of the request being serviced by BMC 402, other requests of the same type wait in the queue for servicing. In one embodiment, start and finish timestamps are also stored with each entry in the queue.

Command submitter and value forwarder 503 forwards BMC requests to the BMC. In one embodiment, only one BMC request is moved into command submitter and value forwarder 503 at one time. As stated above, this could be a newly received request from the request parser 501 or a waiting request stored in queue(s) 502. This is because BMC 402 only services one request at a time.

In one embodiment, command submitter and value forwarder 503 uses authentication information 505 stored in a memory of, or accessible by, request coordinator 500 to perform an authentication check to authenticate each request. In one embodiment, if a request is not authenticated, it is reconstructed. In another embodiment, such a request is declined.

In one embodiment, command submitter and value forwarder 503 uses data freshness indicator 506 stored in a memory of, or accessible by, request coordinator 500 to perform a data freshness check. In one embodiment, freshness means whether the returned data has been too old. Upon seeing returned data, in one embodiment, the coordination entity buffers the data and adds a timestamp T for the data. For example, T=03/24/16-11:45:53.123456 pm. 100 microseconds later, 03/24/16-11:45:53.123556 pm, there is another incoming request for the same data. If any of that data is predefined to only be fresh for 50 us, then the data is too old to be returned to the new request.

If the returned value is fresh enough and there is no violation of authentication rules, then command submitter and value forwarder 503 forwards the return value to waiting BMC requests in queue(s) 502. When responses received from the BMC, including any values associated therewith, are ready to be returned to the requesters, command submitter and value forwarder 503 sends them to the requesters via a return buffer 507.

Figure 6A:
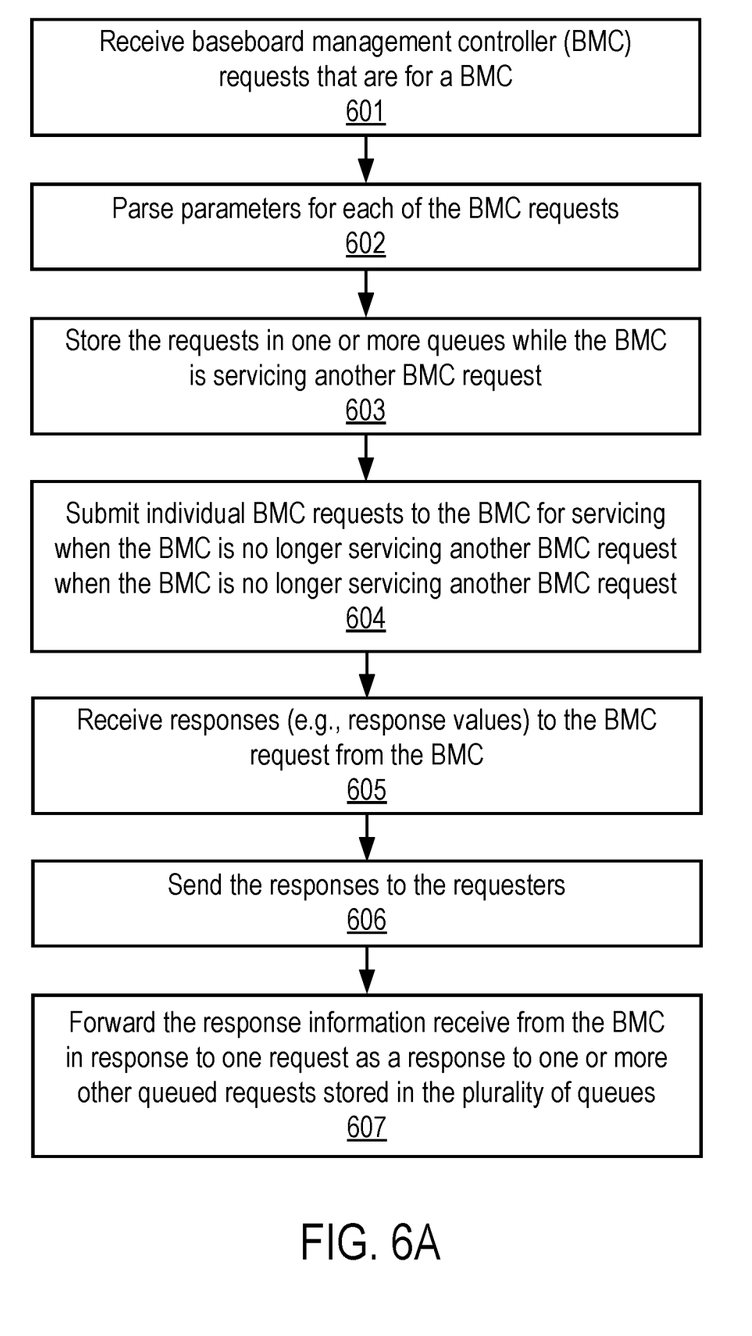
FIG. 6A is a flow diagram of one embodiment of a process for handling BMC requests using a request coordinator.

FIG. 6A is a flow diagram of one embodiment of a process for handling BMC requests using a request coordinator. In one embodiment, the process is performed by processing logic that may comprise hardware (circuitry, dedicated logic, etc.), software (such as is run on a general purpose computer system or a dedicated machine), firmware, or a combination of the three. In one embodiment, the process of FIG. 6A is performed by the request coordinator.

Referring to FIG. 6A, the process begins by processing logic receiving baseboard management controller (BMC) requests that are for a BMC (processing block 601). In response to receiving the requests, processing logic parses parameters for each of the BMC requests (processing block 602) and stores the requests in one or more queues while the BMC is servicing another BMC request (processing block 603). In one embodiment, storing the requests in one or more queues while the BMC is servicing another BMC request comprises storing the requests in a plurality of queues, where each queue stores the same type of request (e.g., same sensor address or same pre-defined telemetry name).

Processing logic submits individual BMC requests to the BMC for servicing when the BMC is no longer servicing another BMC request (processing block 604). That is, when the BMC is not busy servicing a BMC request, another BMC request can be sent to it for servicing.

Subsequently, processing logic receives responses (e.g., response values) to the BMC requests from the BMC (processing block 605) and sends the responses to the requesters (processing block 605).

Figure 6B:
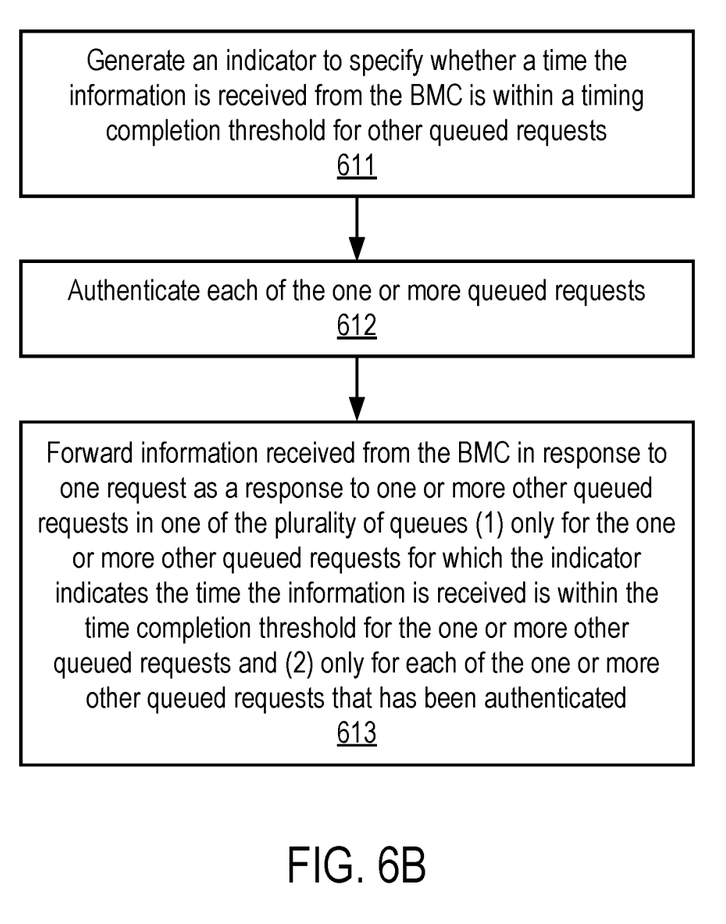
FIG. 6B is a flow diagram of one embodiment of a process for forwarding a response from one request as the response for one or more other queued requests.

In one embodiment, processing logic forwards the response information received from the BMC in response to one request as a response to one or more other queued requests stored in the plurality of queues (processing block 606). FIG. 6B is a flow diagram of one embodiment of a process for forwarding a response from one request as the response for one or more other queued requests. In one embodiment, the process is performed by processing logic that may comprise hardware (circuitry, dedicated logic, etc.), software (such as is run on a general purpose computer system or a dedicated machine), firmware, or a combination of the three. In one embodiment, the process of FIG. 6B is performed by the request coordinator.

Referring to FIG. 6B, the process begins by generating an indicator to specify whether a time the information is received from the BMC is within a timing completion threshold for other queued requests (processing block 611). Processing logic also authenticates each of the one or more queued requests (processing block 612). Based on the results of those operations, processing logic forwards information received from the BMC in response to one request as a response to one or more other queued requests in one of the plurality of queues only for the one or more other queued requests for which the indicator indicates the time the information is received is within the timing completion threshold for the one or more other queued requests and only for each of the one or more other queued requests that has been authenticated (processing block 613).

Figure 7:
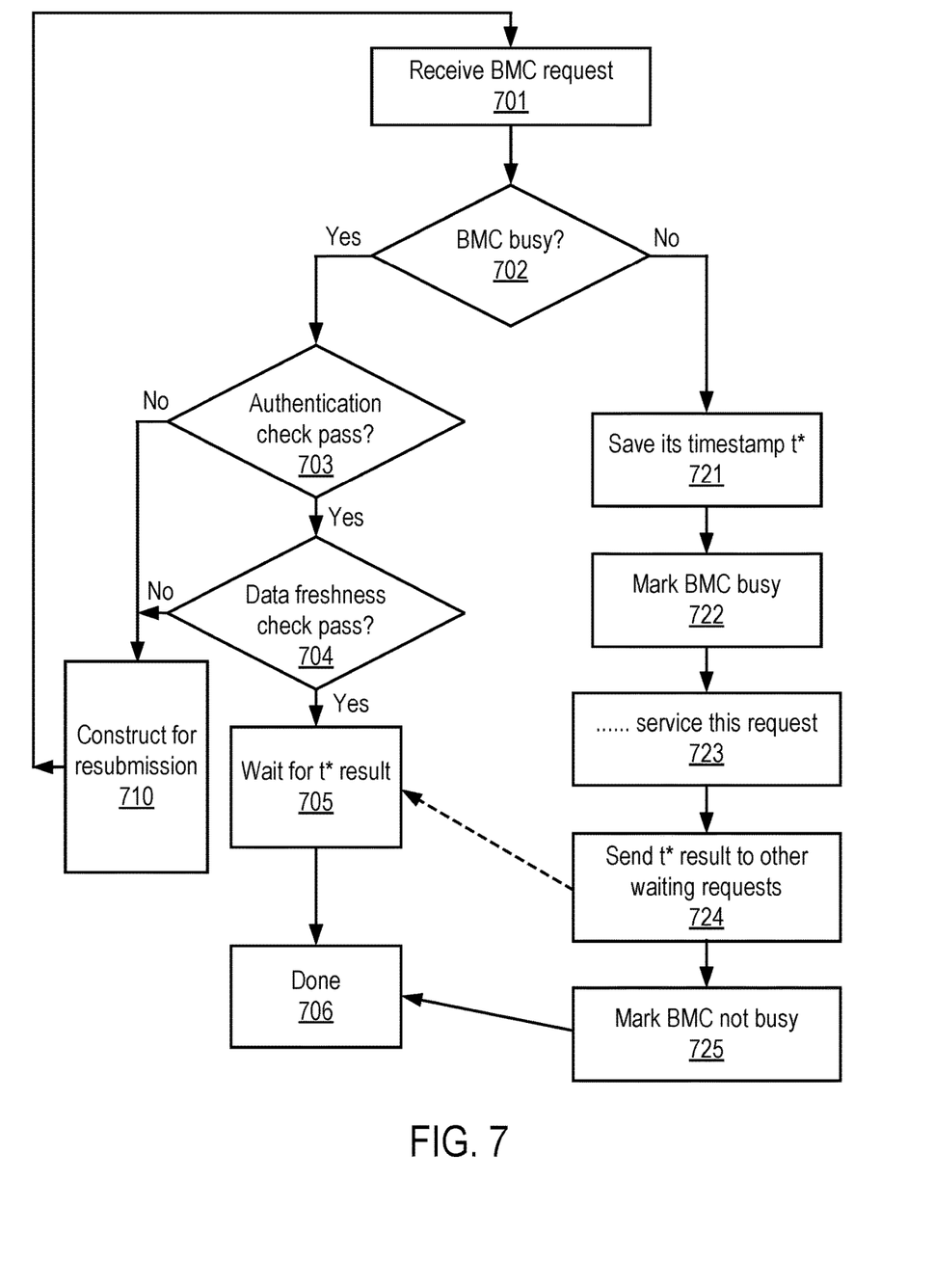
FIG. 7 is a flow diagram of one embodiment of a process performed by the command submitter and value forwarder of a request coordinator.

FIG. 7 is a flow diagram of one embodiment of a process performed by the command submitter and value forwarder of a request coordinator. In one embodiment, the process is performed by processing logic that may comprise hardware (circuitry, dedicated logic, etc.), software (such as is run on a general purpose computer system or a dedicated machine), firmware, or a combination of the three. In one embodiment, this process is performed for all BMC queries.

Referring to FIG. 7, the process begins by receiving a BMC request (processing block 701). In response to receiving the request, processing logic determines whether the BMC is busy (processing block 602). The BMC may be busy because it is handling a previously received BMC request. There may be other reasons why a BMC is busy and unable to handle requests at the current time.

If the BMC is not busy, and therefore, can handle servicing the request, then processing logic transitions to processing block 721 where processing logic saves a timestamp of the request. In one embodiment, the timestamp is save in the queues used to store the requests (e.g., queue(s) 502 of FIG. 5). Also as part of sending the request to the BMC, processing logic sets a busy indicator (e.g., register bit, marker, etc.) indicating that the BMC is busy (processing block 722). This will be checked when determining whether to send another request to the BMC. Processing logic then sends the request for servicing by the BMC (processing block 723).

Subsequently, the BMC sends the results of servicing request, which are received by processing logic of the command submitter and value forwarder. Processing logic sends the results to other waiting requests (processing block 724). That is, the results that come back from the BMC may not only be able to satisfy the request that the BMC was servicing but other requests that had been queued previously or during the time the BMC was servicing the current request. Processing logic also sets the busy indicator to indicate that the BMC is no longer busy (processing block 725).

If processing logic determines the BMC is busy at processing block 702, the process transitions to processing block 703 where processing logic checks whether the request was authenticated. The authentication check may take many forms. In one embodiment, the authentication check is a credential-based authentication check that checks whether the requester generating the request has a right or privilege level that allows it to read the sensor value. In another embodiment, the authentication check compares when a setting or value is needed versus when the value can be provided and indicates whether the request is authenticated based on this comparison. For example, if the request needs the value within 1 msec but the response would not be available for 2 msec, then the request would not be authenticated. If the request doesn't pass the authentication check, the request coordinator cannot trust the request and the process transitions to processing block 710 where the request is constructed for re-submission (e.g., starts over) and then to processing block 701 where the process is repeated for the next BMC request.

If the request has been authenticated, the process transitions to processing block 704 where processing logic tests whether the request passed a data freshness check. In one embodiment, the data freshness check uses at least one threshold to determine whether the data being returned with a response from the BMC (e.g., the BMC latency) is when it was supposed to be returned. In one embodiment, the threshold is pre-set. The threshold may be determined in a number of ways (e.g., according to administrators experience and/or product/customers' requirements) but is longer than BMC's typical delay. If the request doesn't pass the data freshness check, the process transitions to processing block 710 where the request is constructed for re-submission and then to processing block 701 where the process is repeated for the next BMC request. If the request passed its data freshness check, the process waits for results received from the BMC servicing other requests to see if those same results satisfy one or more of the queued requests (processing block 705). In one embodiment, the timestamp associated with the request that has its response from the BMC is compared to other timestamps in the request queue to determine potentially relevant requests that can be completed with results from this response (e.g., a response to another BMC request). If so, then processing logic forwards those results to those other requests. That is, the results of one request are sent as part of a response to another set of one or more requests that are pending and have not been serviced. After that has been completed, the process is done (706).

Thus, using the techniques described herein, a BMC or other management controller for a node can have reduced number of denial-of-service problems. Also, such systems can have better performance because of elimination of unnecessary BMC denial-of-service incurred performance throttling.

Figure 8:
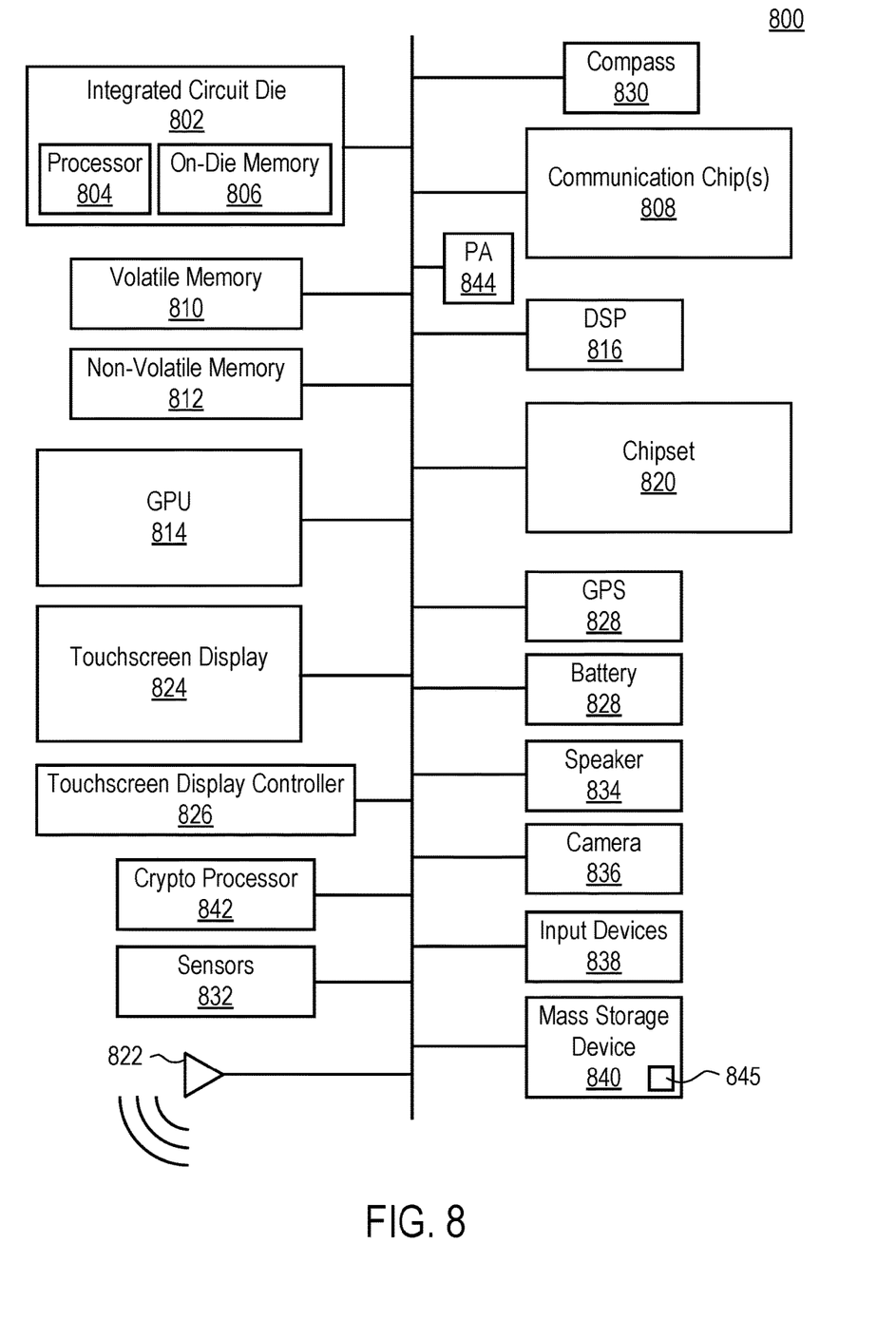
FIG. 8 illustrates a data processing system 800 in accordance with one embodiment.

A node in the HPC system typically has a large number of cores (e.g., about 100 cores, or any other large number of cores) and each has node management, such as a BMC and request coordinator. FIG. 8 illustrates a data processing system 800 in accordance with one embodiment. Data processing system 800 represents any data processing system to perform node management, as described herein with respect to FIGS. 3-7. In alternative embodiments, the data processing system 800 may be connected (e.g., networked) to other machines in a Local Area Network (LAN), an intranet, an extranet, or the Internet. The data processing system 800 may operate in the capacity of a server or a client machine in a client-server network environment, or as a peer machine in a peer-to-peer (or distributed) network environment.

The data processing system 800 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein.

A processor 804 represents one or more general-purpose processing devices such as a microprocessor, central processing unit, or other processing device. More particularly, the processor 804 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 804 may also be one or more special-purpose processing devices such as an application specific integrated circuit (ASIC), a field programmable gate array (FPGA), a digital signal processor (DSP), network processor, or the like. Processor 804 is configured to control a processing logic for performing the operations described herein with respect to FIGS. 1-5.

The data processing system 800 may include a number of components. In one embodiment, these components are attached to one or more motherboards. In an alternate embodiment, these components are fabricated onto a single system-on-a-chip (SoC) die rather than a motherboard. The components in the data processing system 800 include, but are not limited to, an integrated circuit die 802 and at least one communication chip 808. In some implementations the communication chip 808 is fabricated as part of the integrated circuit die 802. The integrated circuit die 802 may include processor 804, an on-die memory 806, often used as cache memory, that can be provided by technologies such as embedded DRAM (eDRAM) or spin-transfer torque memory (STTM or STTM-RAM).

Data processing system 800 may include other components that may or may not be physically and electrically coupled to the motherboard or fabricated within an SoC die. These other components include, but are not limited to, a volatile memory 810 (e.g., DRAM), a non-volatile memory 812 (e.g., ROM or flash memory), a graphics processing unit 814 (GPU), a digital signal processor 816, a crypto processor 842 (a specialized processor that executes cryptographic algorithms within hardware), a chip set 820, an antenna 822, a display or a touchscreen display 824, a touchscreen controller 826, a battery 828 or other power source, a power amplifier (PA) 844, a global positioning system (GPS) device 828, a compass 830, sensors 832 (that may include one or more power measurement sensor to measure power as described above, and any other sensor), a speaker 834, a camera 836, user input devices 838 (such as a keyboard, mouse, stylus, and touchpad), and a mass storage device 840 (such as hard disk drive, compact disk (CD), digital versatile disk (DVD), and so forth).

The communications chip 808 enables wireless communications for the transfer of data to and from the data processing system 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 808 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 800 may include a plurality of communication chips 808. For instance, a first communication chip 808 may be dedicated to shorter range wireless communications such as Wi-Fi and Bluetooth and a second communication chip 808 may be dedicated to longer range wireless communications such as GPS, EDGE, GPRS, CDMA, WiMAX, LTE, Ev-DO, and others. The term "processor" may refer to any device or portion of a device that processes electronic data from registers and/or memory to transform that electronic data into other electronic data that may be stored in registers and/or memory.

In various embodiments, the data processing system 800 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, a digital video recorder, or a part of the HPC system, cloud system, or any other data processing system. In further implementations, the data processing system 800 may be any other electronic device that processes data.

The mass storage device 840 may include a machine-accessible storage medium (or more specifically a computer-readable storage medium) 844 on which is stored one or more sets of instructions (e.g., a software) embodying any one or more of the methodologies or functions described herein. The software may also reside, completely or at least partially, within the memory 810, memory 812, memory 806 and/or within the processor 804 during execution thereof by the data processing system 800, the on-die memory 806 and the processor 804 also constituting machine-readable storage media. The software may further be transmitted or received over a network via a network interface device.

While the machine-accessible storage medium 844 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In a first example embodiment, an apparatus comprises: a baseboard management controller (BMC); and a request coordinator coupled to the BMC to intercept BMC requests and to provide intercepted requests to the BMC, where the coordination interface comprising a request parser to parse parameters for each of the BMC requests, one or more queues to store the requests while the BMC is servicing another BMC request, and a command submitter to send individual BMC requests to the BMC, and wherein the BMC is operable to generate the responses to the BMC requests received from the coordination interface and to send the responses to the coordination interface.

In another example embodiment, the subject matter of the first example embodiment can optionally include that the one or more queues comprises a plurality of queues, wherein each of the plurality of queues stores requests having one or more matching parameters, and further comprising an information forwarder to forward information received from the BMC in response to one request as a response to one or more other queued requests in one of the plurality of queues.

In another example embodiment, the subject matter of the first example embodiment can optionally include data check logic to generate an indicator to specify whether a time the information is received from the BMC is within a timing completion threshold for other queued requests, and wherein the information forwarder only forwards the information as the response to the one or more other queued requests for the one or more other queued requests for which the indicator indicates the time the information is received is within the timing completion threshold. In another example embodiment, the subject matter of this example embodiment can optionally include that authentication check logic to authenticate each of the one or more queued requests, and wherein the information forwarder only forwards the information as the response to the one or more other queued requests for each of the one or more other queued requests that has been authenticated by the authentication check logic.

In another example embodiment, the subject matter of the first example embodiment can optionally include that the command submitter is operable to submit one BMC request at a time.

In another example embodiment, the subject matter of the first example embodiment can optionally include that the command submitter is operable to receive one BMC request and determine if the BMC busy, and further wherein if the BMC is not busy, then the command submitter is operable to save a timestamp of the one request, send the one request to the BMC, and set an indicator that indicates the BMC is busy, the command submitter to set the indicator to indicate the BMC is not busy in response to receiving results of the servicing the request from the BMC.

In another example embodiment, the subject matter of the first example embodiment can optionally include that one or more of the BMC requests are from a sensor interface.

In a second example embodiment, a rack server system comprises: a plurality of nodes, each of the nodes comprising a baseboard management controller (BMC), and a request coordinator coupled to the BMC to intercept BMC requests and to provide intercepted requests to the BMC, where the coordination interface comprises a request parser to parse parameters for each of the BMC requests, one or more queues to store the requests while the BMC is servicing another BMC request, and a command submitter to send individual BMC requests to the BMC, and wherein the BMC is operable to generate the responses to the BMC requests received from the coordination interface and to send the responses to the coordination interface.

In another example embodiment, the subject matter of the second example embodiment can optionally include that the one or more queues comprises a plurality of queues, wherein each of the plurality of queues stores requests having one or more matching parameters, and further comprising an information forwarder to forward information received from the BMC in response to one request as a response to one or more other queued requests in one of the plurality of queues. In another example embodiment, the subject matter of this example embodiment can optionally include data check logic to generate an indicator to specify whether a time the information is received from the BMC is within a timing completion threshold for other queued requests, and wherein the information forwarder only forwards the information as the response to the one or more other queued requests for the one or more other queued requests for which the indicator indicates the time the information is received is within the timing completion threshold.

In another example embodiment, the subject matter of the second example embodiment can optionally include authentication check logic to authenticate each of the one or more queued requests, and wherein the information forwarder only forwards the information as the response to the one or more other queued requests for each of the one or more other queued requests that has been authenticated by the authentication check logic.

In another example embodiment, the subject matter of the second example embodiment can optionally include that the command submitter is operable to submit one BMC request at a time.

In another example embodiment, the subject matter of the second example embodiment can optionally include that the command submitter is operable to receive one BMC request and determine if the BMC busy, and further wherein if the BMC is not busy, then the command submitter is operable to save a timestamp of the one request, send the one request to the BMC, and set an indicator that indicates the BMC is busy, the command submitter to set the indicator to indicate the BMC is not busy in response to receiving results of the servicing the request from the BMC.

In another example embodiment, the subject matter of the second example embodiment can optionally include that one or more of the BMC requests are from a sensor interface.

In a third example embodiment, a method comprises receiving baseboard management controller (BMC) requests that are for a BMC, parsing parameters for each of the BMC requests, storing the requests in one or more queues while the BMC is servicing another BMC request, submitting individual BMC requests to the BMC for servicing when the BMC is no longer servicing another BMC request, receiving responses to the BMC requests, and sending the responses to the coordination interface.

In another example embodiment, the subject matter of the third example embodiment can optionally include that storing the requests in one or more queues while the BMC is servicing another BMC request comprises storing the requests in a plurality of queues, wherein each of the plurality of queues stores requests having one or more matching parameters, and further comprising forwarding information received from the BMC in response to one request as a response to one or more other queued requests in one of the plurality of queues. In another example embodiment, the subject matter of this example embodiment can optionally include generating an indicator to specify whether a time the information is received from the BMC is within a timing completion threshold for other queued requests, and wherein forwarding information received from the BMC in response to one request as a response to one or more other queued requests in one of the plurality of queues only occurs for the one or more other queued requests for which the indicator indicates the time the information is received is within the timing completion threshold for the one or more other queued requests.

In another example embodiment, the subject matter of the third example embodiment can optionally include authenticating each of the one or more queued requests, and wherein forwarding information received from the BMC in response to one request as a response to one or more other queued requests in one of the plurality of queues only occurs for each of the one or more queued requests that has been authenticated.

In another example embodiment, the subject matter of the third example embodiment can optionally include determining if the BMC busy prior to forwarding one request of the BMC requests to the BMC, saving a timestamp of the one request prior to sending the one request to the BMC, setting an indicator that indicates the BMC is busy so no additional requests are forwarded to the BMC while the BMC services the one request, and setting the indicator to indicate the BMC is not busy in response to receiving results of servicing the one request from the BMC.

In another example embodiment, the subject matter of the third example embodiment can optionally include that one or more of the BMC requests are related to a sensor.

In a fourth example embodiment, an article of manufacture has one or more non-transitory computer readable media storing instructions which, when executed by a system, cause the system to perform a method comprising receiving baseboard management controller (BMC) requests that are for a BMC, parsing parameters for each of the BMC requests, storing the requests in one or more queues while the BMC is servicing another BMC request, submitting individual BMC requests to the BMC for servicing when the BMC is no longer servicing another BMC request, receiving responses to the BMC requests, and sending the responses to the coordination interface.

In another example embodiment, the subject matter of the fourth example embodiment can optionally include that storing the requests in one or more queues while the BMC is servicing another BMC request comprises storing the requests in a plurality of queues, wherein each of the plurality of queues stores requests having one or more matching parameters, and wherein the method further comprises forwarding information received from the BMC in response to one request as a response to one or more other queued requests in one of the plurality of queues.

In another example embodiment, the subject matter of the fourth example embodiment can optionally include that the method further comprises generating an indicator to specify whether a time the information is received from the BMC is within a timing completion threshold for other queued requests, and wherein forwarding information received from the BMC in response to one request as a response to one or more other queued requests in one of the plurality of queues only occurs for the one or more other queued requests for which the indicator indicates the time the information is received is within the timing completion threshold for the one or more other queued requests.

In another example embodiment, the subject matter of the fourth example embodiment can optionally include that the method further comprises authenticating each of the one or more queued requests, and wherein forwarding information received from the BMC in response to one request as a response to one or more other queued requests in one of the plurality of queues only occurs for each of the one or more other queued requests that has been authenticated.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
 a baseboard management controller (BMC) having one or more processors;
 a request coordinator coupled to the BMC to intercept BMC requests received via a network interface and to provide intercepted requests to the BMC, the request coordinator comprising;
  a request parser to parse parameters for each of the BMC requests,
  one or more queues to store the requests while the BMC is servicing another BMC request, and
  a command submitter to send individual BMC requests to the BMC,
 wherein the BMC is operable to generate the responses to the BMC requests received from the request coordinator and to send the responses to the request coordinator;
 authentication check logic to authenticate each of the one or more queued requests; and
 an information forwarder to forward information received from the BMC in response to one request as a response to one or more other queued requests in one of the plurality of queues, wherein the information forwarder only forwards the information as the response to the one or more other queued requests for each of the one or more other queued requests that has been authenticated by the authentication check logic.

2. The apparatus defined in claim 1 wherein the one or more queues comprises a plurality of queues, wherein each of the plurality of queues stores requests having one or more matching parameters.

3. The apparatus defined in claim 2 further comprising data check logic to generate an indicator to specify whether a time the information is received from the BMC is within a timing completion threshold for other queued requests, and wherein the information forwarder only forwards the information as the response to the one or more other queued requests for the one or more other queued requests for which the indicator indicates the time the information is received is within the timing completion threshold.

4. The apparatus defined in claim 1 wherein the command submitter is operable to submit one BMC request at a time.

5. The apparatus defined in claim 4 wherein the command submitter is operable to receive one BMC request and determine if the BMC busy, and further wherein if the BMC is not busy, then the command submitter is operable to save a timestamp of the one request, send the one request to the BMC, and set an indicator that indicates the BMC is busy, the command submitter to set the indicator to indicate the BMC is not busy in response to receiving results of the servicing the request from the BMC.

6. The apparatus defined in claim 1 wherein one or more of the BMC requests are from a sensor interface.

7. A rack server system comprising:
a plurality of nodes, each of the nodes comprising:
a baseboard management controller (BMC) having one or more processors;
a request coordinator coupled to the BMC to intercept BMC requests received via a network interface and to provide intercepted requests to the BMC, the request coordinator comprising
a request parser to parse parameters for each of the BMC requests,
one or more queues to store the requests while the BMC is servicing another BMC request, and
a command submitter to send individual BMC requests to the BMC,
wherein the BMC is operable to generate the responses to the BMC requests received from the request coordinator and to send the responses to the request coordinator;
authentication check logic to authenticate each of the one or more queued requests; and
an information forwarder to forward information received from the BMC in response to one request as a response to one or more other queued requests in one of the plurality of queues, wherein the information forwarder only forwards the information as the response to the one or more other queued requests for each of the one or more other queued requests that has been authenticated by the authentication check logic.

8. The rack server system defined in claim 7 wherein the one or more queues comprises a plurality of queues, wherein each of the plurality of queues stores requests having one or more matching parameters.

9. The rack server system defined in claim 8 further comprising data check logic to generate an indicator to specify whether a time the information is received from the BMC is within a timing completion threshold for other queued requests, and wherein the information forwarder only forwards the information as the response to the one or more other queued requests for the one or more other queued requests for which the indicator indicates the time the information is received is within the timing completion threshold.

10. The rack server system defined in claim 7 wherein the command submitter is operable to submit one BMC request at a time.

11. The rack server system defined in claim 10 wherein the command submitter is operable to receive one BMC request and determine if the BMC busy, and further wherein if the BMC is not busy, then the command submitter is operable to save a timestamp of the one request, send the one request to the BMC, and set an indicator that indicates the BMC is busy, the command submitter to set the indicator to indicate the BMC is not busy in response to receiving results of the servicing the request from the BMC.

12. The rack server system defined in claim 7 wherein one or more of the BMC requests are from a sensor interface.

13. A method comprising:
receiving, via a coordination interface, baseboard management controller (BMC) requests that are for a BMC, the coordination interface being outside of the BMC and the BMC requests being received via a network interface;
parsing parameters for each of the BMC requests;
storing the requests in one or more queues while the BMC is servicing another BMC request using one or more processors of the BMC;
submitting individual BMC requests to the BMC for servicing when the BMC is no longer servicing another BMC request;
receiving responses to the BMC requests from the BMC at the coordination interface;
sending, via the coordination interface, the responses to the coordination interface;
authenticating each of the one or more queued requests; and
forwarding information received from the BMC in response to one request as a response to one or more other queued requests in one of the plurality of queues, wherein forwarding information received from the BMC in response to one request as a response to one or more other queued requests in one of the plurality of queues only occurs for each of the one or more other queued requests that has been authenticated.

14. The method defined in claim 13 wherein storing the requests in one or more queues while the BMC is servicing another BMC request comprises storing the requests in a plurality of queues, wherein each of the plurality of queues stores requests having one or more matching parameters.

15. The method defined in claim 14 further comprising generating an indicator to specify whether a time the information is received from the BMC is within a timing completion threshold for other queued requests, and wherein forwarding information received from the BMC in response to one request as a response to one or more other queued requests in one of the plurality of queues only occurs for the one or more other queued requests for which the indicator indicates the time the information is received is within the timing completion threshold for the one or more other queued requests.

16. The method defined in claim 13 further comprising:
determining if the BMC busy prior to forwarding one request of the BMC requests to the BMC;
saving a timestamp of the one request prior to sending the one request to the BMC;

setting an indicator that indicates the BMC is busy so no additional requests are forwarded to the BMC while the BMC services the one request; and setting the indicator to indicate the BMC is not busy in response to receiving results of servicing the one request from the BMC.

17. The method defined in claim 13 wherein one or more of the BMC requests are related to a sensor.

18. An article of manufacture having one or more non-transitory computer readable media storing instructions which, when executed by a system, cause the system to perform a method comprising:

receiving, via a coordination interface, baseboard management controller (BMC) requests that are for a BMC, the coordination interface being outside of the BMC and the BMC requests being received via a network interface;

parsing parameters for each of the BMC requests;

storing the requests in one or more queues while the BMC is servicing another BMC request using one or more processors of the BMC;

submitting individual BMC requests to the BMC for servicing when the BMC is no longer servicing another BMC request;

receiving responses to the BMC requests from the BMC at the coordination interface;

sending, via the coordination interface, the responses to the coordination interface;

authenticating each of the one or more queued requests; and forwarding information received from the BMC in response to one request as a response to one or more other queued requests in one of the plurality of queues, wherein forwarding information received from the BMC in response to one request as a response to one or more other queued requests in one of the plurality of queues only occurs for each of the one or more other queued requests that has been authenticated.

19. The article of manufacture defined in claim 18 wherein storing the requests in one or more queues while the BMC is servicing another BMC request comprises storing the requests in a plurality of queues, wherein each of the plurality of queues stores requests having one or more matching parameters.

20. The article of manufacture defined in claim 19 wherein the method further comprises generating an indicator to specify whether a time the information is received from the BMC is within a timing completion threshold for other queued requests, and wherein forwarding information received from the BMC in response to one request as a response to one or more other queued requests in one of the plurality of queues only occurs for the one or more queued requests for which the indicator indicates the time the information is received is within the timing completion threshold for the one or more other queued requests.

* * * * *